(12) United States Patent
Chen

(10) Patent No.: US 10,839,193 B1
(45) Date of Patent: Nov. 17, 2020

(54) CURVED FINGERPRINT RECOGNIZING DEVICE

(71) Applicant: Chin-Ming Chen, Miaoli County (TW)

(72) Inventor: Chin-Ming Chen, Miaoli County (TW)

( * ) Notice: Subject to any disclaimer, the term of this patent is extended or adjusted under 35 U.S.C. 154(b) by 0 days.

(21) Appl. No.: 16/660,820

(22) Filed: Oct. 23, 2019

(30) Foreign Application Priority Data

Aug. 1, 2019 (TW) .............................. 108210154 U

(51) Int. Cl.
*G06K 9/74* (2006.01)
*G06K 9/00* (2006.01)
*G06K 9/20* (2006.01)

(52) U.S. Cl.
CPC ........... *G06K 9/0004* (2013.01); *G06K 9/209* (2013.01); *G06K 9/2036* (2013.01)

(58) Field of Classification Search
CPC ............ G06K 9/00046; G06K 9/00013; A61B 5/1172; G07D 7/12; G07D 7/122
USPC .......................................................... 356/71
See application file for complete search history.

(56) References Cited

U.S. PATENT DOCUMENTS

2010/0230615 A1* 9/2010 MacPherson .......... D21H 21/48
250/488.1
2017/0372152 A1* 12/2017 Baek .................... A61B 5/0452

* cited by examiner

*Primary Examiner* — Md M Rahman

(57) ABSTRACT

A curved fingerprint recognizing device with a light-guiding component, a first reflecting layer, a second reflecting layer, light source and an image capturing component is disclosed. In the light-guiding component, a first surface has a curved surface, a second surface locates opposite to the first surface, an outer side wall inclinedly connects the first surface and the second surface, an inner side wall inclinedly connects to the second surface, and a bottom surface connects horizontally the outer side wall and the inner side wall. The light beam emitted from the light source is reflected by the first reflecting layer and the second reflecting layer after passing through the bottom surface to be transmitted to the first surface having the curved surface and thereby fingerprints of a bottom and sidewalls of an object to be recognized can be obtained by the image capturing component at the same time.

20 Claims, 16 Drawing Sheets

CURVED FINGERPRINT RECOGNIZING DEVICE

CROSS-REFERENCE TO RELATED APPLICATION

This application claims priority from Taiwan Patent Application No. 108210154, filed on Aug. 1, 2019, in the Taiwan Intellectual Property Office, the content of which are hereby incorporated by reference in their entirety for all purposes.

BACKGROUND OF THE INVENTION

1. Field of the Invention

The present invention relates to a fingerprint recognizing device, in particular with respect to a curved fingerprint recognizing device.

2. Description of the Related Art

Nowadays, fingerprint recognizing is widely applied in various electronic products, and particularly, it is most common in portable mobile devices like smart phones, tablet computers, etc. In the pursuit of better visual experience, the display screens of current electronic products are gradually developing toward the trend of high screen ratio and narrow bezel. As a result, the fingerprint recognizing module shall be changed and configured below the display screen. Therefore, the fingerprint on display (FOD) technology is developed. The FOD technology can be mainly divided into optical fingerprint recognition and ultrasonic fingerprint recognition. However, optical FOD still has some problems to overcome such as low light beam penetration, unstable recognizing performance and high production cost. Hence, there is an urgent need for those skilled in the art to solve these problems.

SUMMARY OF THE INVENTION

In view of the aforementioned technical problems of the prior art, one purpose of the present invention is to provide a curved fingerprint recognizing device to overcome the above-mentioned problems in connection with the prior art.

In order to accomplish the preceding purpose, the present invention provides a curved fingerprint recognizing device at least comprising a light-guiding component, a first reflecting layer, a second reflecting layer, a light source and an image capturing component. The light-guiding component comprises: a first surface, at least comprising a curved surface, and a height of a center of the first surface is lower than heights of two sides of the first surface; a second surface, located opposite to the first surface; an outer side wall, connected between the first surface and the second surface, the outer side wall being inclined relative to the first surface; an inner side wall, connected to the second surface and the bottom surface and inclined relative to the first surface; and a bottom surface, located opposite to the first surface, and connected horizontally between the outer side wall and the inner side wall. The first reflecting layer and the second reflecting layer are disposed on the outer side wall and the inner side wall respectively. The light source is disposed between the outer side wall and the inner side wall of the light-guiding component for emitting a light beam. The image capturing component is located opposite to the second surface of the light-guiding component, wherein the light beam is reflected by at least one of the first reflecting layer and the second reflecting layer after passing through the bottom surface so as to be transmitted to the first surface having the curved surface and thereby obtaining fingerprints of a bottom and sidewalls of an object to be recognized at the same time.

Wherein the curved fingerprint recognizing device further comprises a plano-convex lens disposed on the second surface, wherein a flat surface of the plano-convex lens contacts with the second surface, and a convex surface of the plano-convex lens faces the first surface.

Wherein the curved fingerprint recognizing device further comprises a third reflecting layer disposed on one part of the bottom surface, and the light beam is reflected by at least one of the first reflecting layer, the second reflecting layer and the third reflecting layer after passing through the other part of the bottom surface so as to be transmitted to the first surface having the curved surface.

Wherein the first surface is composed of the curved surface.

Wherein the first surface is composed of two arc surfaces and a plane, and the plane is connected between the two arc surfaces.

Wherein a distance between the outer side wall and the inner side wall is increased or decreased along with increasing a distance far away from the first surface.

Wherein the curved fingerprint recognizing device further comprises at least one collimator disposed between the second surface of the light-guiding component and the image capturing component.

Wherein the outer side wall is extending to a side of the first surface from the second surface, and a height of the outer side wall is higher than the height of the center of the first surface.

Wherein the light-guiding component is made of hard materials or flexible materials.

Wherein the first surface has an opening, and the light beam is transmitted to the opening of the first surface.

Wherein the outer side wall is pivotally connected to the bottom surface of the light-guiding component.

Wherein an inclination angle of the outer side wall is changed according to a downward force of the object to be recognized.

Wherein the light source is disposed underneath the bottom surface of the light-guiding component.

Wherein a depth of the center of the first surface is larger than or equal to half of a height of the object to be recognized.

Wherein a height of a connection point of the outer side wall and the first surface is higher than the height of the center of the first surface.

Wherein the first surface and second surface of the light-guiding component constitute a plano-concave lens.

Wherein the bottom surface has multiple stages with different heights.

Wherein the second surface and the inner side wall define a trench of the light-guiding component.

Wherein an inner diameter of the trench is increased along with increasing a distance far away from the first surface.

The curved fingerprint recognizing device of the present invention further comprises a support extending from the bottom surface toward a side of the light source.

In accordance with the preceding description, the curved fingerprint recognizing device may have one or more following advantages:

(1) The light-guiding component has a curved surface and can capture fingerprints of a bottom and sidewalls of an object to be recognized at the same time. Therefore, it not only saves the image capturing time, but also increases the accuracy of subsequent recognition thanks to the increased fingerprint features for interpretation resulting from increased image area.

(2) The collimator can make the divergent light beam change to collimated light beam such that the image capturing quality can be further enhanced.

(3) The light-guiding component has the opening such that the non-planar images of the object to be recognized suspendly placed in the opening can be captured.

(4) The light-guiding component has the flexible material such that the first surface can contact the object to be recognized and its curvature can be changed according to the shape of the object to be recognized.

DETAILED DESCRIPTION OF THE INVENTION

Figure 1:
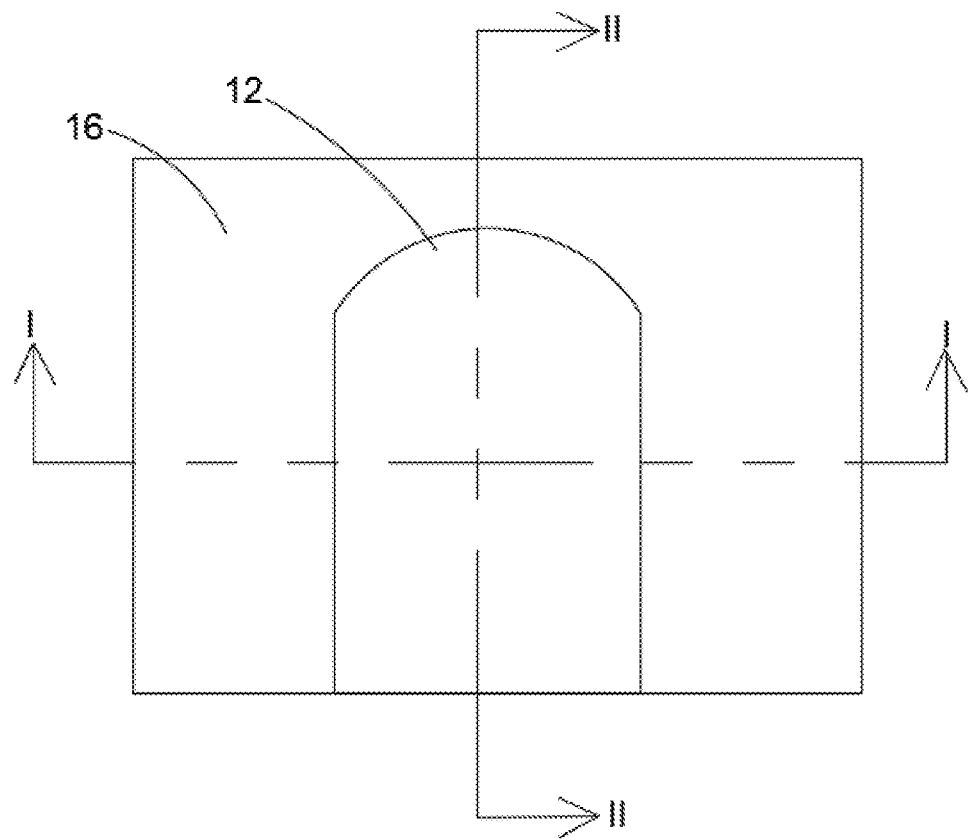
FIG. 1 is a top view of the curved fingerprint recognizing device of the first embodiment of the present invention.

For purposes of understanding the technical features, contents, advantages and technical effects achieved thereby, various embodiments of the present invention will now be described in more detail with reference to the accompanying drawings. Drawings are used for illustrating and assisting in understanding the detailed description, not represent the real scale and precise configuration of the present invention. Therefore, the claims cope of the subject matter are not interpreted or limited by the scale and configuration of the accompanying drawings. Further, for purposes of explanation, in the drawings, similar symbols typically identify similar components, unless context dictates otherwise. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as "first", "second", "third", "fourth" used in the descriptions are not indicating an order or sequence, and are not intending to limit the scope of the present invention. They are used only for differentiation of components or operations described by the same terms.

Moreover, the terms "comprising", "including", "having", and "with" used in the descriptions are all open terms and have the meaning of "comprising but not limited to".

Figure 2:
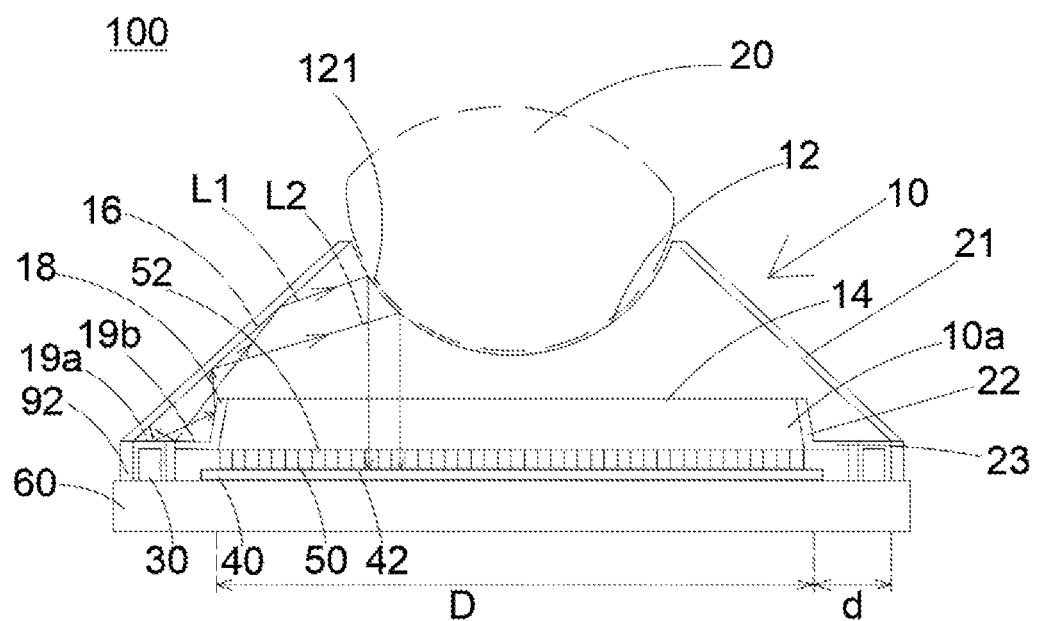
FIG. 2 is a sectional view of the curved fingerprint recognizing device of the first embodiment obtained along the direction I-I in FIG. 1.
Figure 3:
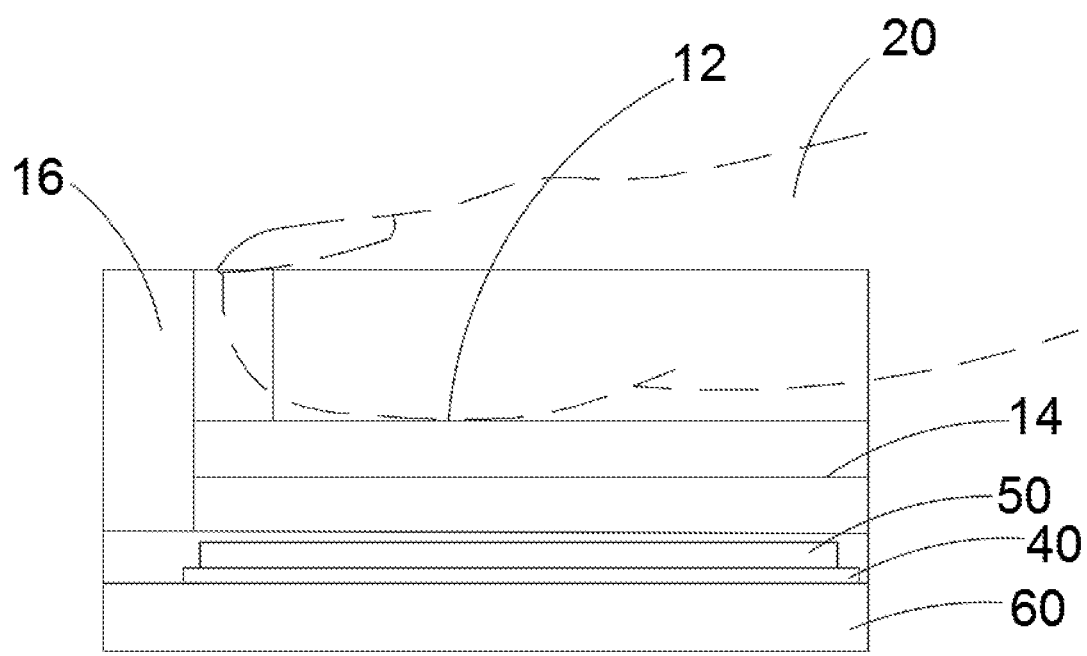
FIG. 3 is a sectional view of the curved fingerprint recognizing device of the first embodiment obtained along the direction II-II in FIG. 1.

Please refer to FIGS. 1 to 3. FIG. 1 is a top view of the curved fingerprint recognizing device of the first embodiment of the present invention, FIG. 2 is a sectional view of the curved fingerprint recognizing device of the first embodiment obtained along the direction I-I in FIG. 1, and FIG. 3 is a sectional view of the curved fingerprint recognizing device of the first embodiment obtained along the direction II-II in FIG. 1. As shown in FIGS. 1 to 3, the curved fingerprint recognizing device 100 of the present invention at least comprises a light-guiding component 10, a light source 30 and an image capturing component 40. The light-guiding component 10 comprises a first surface 12, a second surface 14, an outer side wall 16, an inner side wall 18 and bottom surfaces 19a, 19b. The first surface 12 has a curved surface 121, wherein the curved surface 121 has a convex facet, i.e., it has positive diopter and the height of the center of the first surface 12 is lower than the height of two sides of the first surface 12. The object to be recognized 20 is placed on the first surface 12. The second surface 14 is located opposite to the first surface 12, i.e., the second surface 14 is configured on the opposite side of the first surface 12 with a certain distance. When the object to be recognized 20 is for example a finger, the depth of the center of the first surface 12 shall preferably be larger than or equal to half of the height of the finger. Thus, the user can quickly obtain the whole fingerprint of the finger without learning or teaching by others. The outer side wall 16 is connected to the first surface 12 and extends toward the side of the second surface 14. One end of the outer side wall 16 is connected to the side end of the first surface 12, the height of the connection point of the outer side wall 16 and the first surface 12 is higher than the height of the center of the first surface 12, and the outer side wall 16 is inclined relative to the first surface 12. In the first embodiment, the distance between the outer side wall 16 and the inner side wall 18 is increased along with increasing a distance far away from the first surface 12. One end of the inner side wall 18 is connected to the second surface 14 and is located opposite to the outer side wall 16, i.e., the inner side wall 18 is located on the opposite side of the outer side wall 16 with a certain distance. The other end of the inner side wall 18 is connected to the bottom surface 19b. The bottom surfaces 19a, 19b are located opposite to the first surface 12 and are connected horizontally between the outer side wall 16 and inner side wall 18, i.e., the bottom surfaces 19a, 19b are located on the opposite side of the first surface 12 with a certain distance. In short, the first surface 12 and second surface 14 of the light-guiding component 10 constitute the plano-concave lens, having positive diopter, and meeting the following Eq. (1)

$$f = \frac{R}{n-1}$$
$$te = tc + \left(R - \sqrt{R^2 - \frac{\phi^2}{4}}\right)$$
Eq. (1)

Wherein Ø is diameter, tc is center thickness, R is radius of curvature, to is edge thickness, f is focal length. As an example, light-guiding component 10 can meet this condition: $0.15<R1/f<1.5$, wherein R1 is the radius of curvature of the first surface 12, and f is the focal length of the light-guiding component 10. It is to be noted that, based on actual needs, the light-guiding component 10 can optionally have a lens (not shown in the drawings). For example, the lens can be selected from convex lens, concave lens, plano-convex lens, plano-concave lens, double concave lens or a combination thereof for providing the optical path needed such that the image of the object to be recognized 20 can be captured by the image capturing component 40. In other variations, the bottom surface has multiple stages with different heights. For example, the bottom surface 19a and the bottom surface 19b can be, for example, both configured horizontally, and there is a height difference between the bottom surface 19a and the bottom surface 19b, for example, the bottom surface 19a is higher than the bottom surface 19b or the bottom surface 19a is lower than the bottom surface 19b.

In the first embodiment, the trench 10a of the light-guiding component 10 can be defined by the second surface 14 and the inner side wall 18. The inner side wall 18 can be inclined relative to the first surface 12. The inner diameter D of the trench 10a can increase along the direction away from the first surface 12. In the first embodiment, the degrees of inclination of the outer side wall 16 and inner side wall 18 can be different. For example, the degree of inclination of the outer side wall 16 can be greater than the degree of inclination of the inner side wall 18. The degree of inclination can be adjusted according to actual needs, for example, the outer side wall 16 can have an inclination angle of 45 degrees (deviating from the normal line of the second surface 12), and the inner side wall 18 can have an inclination angle of 30 degrees (deviating from the normal line of the second surface 12). The distance d between the outer side wall 16 and the inner side wall 18 can increase along the direction away from the first surface 12, wherein the distance d refers to the distance between the outer side wall 16 and the inner side wall 18 in the direction parallel to the first surface 12, but the present invention is not limited to this. The light-guiding component 10 can be transparent and solid, and is preferably made of materials with high light transmittance. For example, the light-guiding component 10 can be made of a hard material. More specifically, in the first embodiment, the material of the light-guiding component 10 can be glass, polycarbonate (PC), polymethyl methacrylate (PMMA) or other appropriate materials. In addition, the light-guiding component 10 can also be made of flexible materials with high light transmittance. Such flexible materials can be silicone or other appropriate materials.

In the first embodiment, the curved fingerprint recognizing device 100 can also comprise a first reflecting layer 21, a second reflecting layer 22 and a third reflecting layer 23 disposed on the outer side wall 16, the inner side wall 18 and the bottom surface 19b respectively. In the first embodiment, the first reflecting layer 21 and the second reflecting layer 22 can be any reflecting material capable of reflecting light beams, such as a mirror reflecting layer or a metal reflecting layer.

The light source 30 is disposed underneath the bottom surface 19a of the light-guiding component 10 for emitting a light beam. To simplify the drawings, the present invention only uses light beams L1, L2 for example. In the first embodiment, light beams L1, L2 can be invisible light (for example: infrared light). However, the present invention is not limited thereto. In other variations, light beams L1, L2 can also be visible light (for example: red light, blue light, green light or any combination thereof), or a combination of visible and invisible light. In the first embodiment, the light source 30 can be an LED. However, the present invention is not limited thereto. In other variations, the light source 30 can also be light emitting components of other appropriate types. In FIG. 2, two light sources 30 are applied for example, and the light sources 30 are configured on the opposite two sides of the light-guiding component 10. However, the present invention is not limited thereto. In other variations, there can be only one light source 30, configured on one side of the light-guiding component 10, or the number of light sources 30 can be three or more and configured on three or more sides of the light-guiding component 10.

Moreover, in the first embodiment, the curved fingerprint recognizing device 100 can optionally comprise a support 92. The support 92 extends from the bottom surface 19a toward the side of the light source 30 for maintaining the gap between the bottom surface 19a and the light source 30. In the first embodiment, the support 92 can be integrally formed with the light-guiding component 10, the circuit board 60 or the light source 30, or be a structure independent from the light-guiding component 10, the circuit board 60 and the light source 30. For example, the support 92 can be a spacer or a barrier, but is not limited thereto. In other variations, the curved fingerprint recognizing device 100 do not comprise a support 92, and the light source 30 is configured beside the bottom surfaces 19a, 19b of the light-guiding component 10 by other appropriate manners. For example, in one variation, the curved fingerprint recognizing device 100 do not comprise a support 92, wherein the bottom surface 19a of the light-guiding component 10 can have a recess (not shown in the drawing), and the light source 30 can be optionally configured in the space enclosed by the recess of the bottom surface 19a and the circuit board 60. In another variation, the curved fingerprint recognizing device 100 do not comprise a support 92, and the bottom surface 19a of the light-guiding component 10 do not comprise a recess, but the circuit board 60 can have a recess (not shown in the drawing) such that the light source 30 can be configured in the recess of the circuit board 60, and the bottom surface 19a of the light-guiding component 10 can be configured above the above-mentioned recess of the circuit board 60, and therefore the light beams L1, L2 can also enter into the light-guiding component 10 from the bottom surface 19a without a recess.

The image capturing component 40 is located opposite to the second surface 14 of the light-guiding component 10, i.e., the image capturing component 40 is disposed on the opposite side of the second surface 14 with some distance. More specifically, in the first embodiment, the curved fingerprint recognizing device 100 can also comprise a circuit board 60. The image capturing component 40 can be configured on the circuit board 60 and is electrically connected to the circuit board 60. Furthermore, in the first embodiment, the image capturing component 40 can be configured in the trench 10a of the light-guiding component 10, i.e., the image capturing component 40 is disposed in the space enclosed by the trench 10a of the light-guiding component 10 and the circuit board 60, but not limited thereto. The image capturing component 40 has multiple pixel zones 42 arranged in a plurality of arrays, to receive the light beams L1, L2 reflected by the object to be recognized 20 for subsequently obtaining the image of the object to be recognized 20. In the first embodiment, the image capturing component 40 can be a charge-coupled device (CCD), complementary metal oxide semiconductor (CMOS) or image sensor array of other appropriate types. The object to be recognized 20 can be the biological feature of an organism, for example, a finger or a palm, for obtaining images of fingerprint, vein, palm print or any combination thereof, but not limited thereto. In abnormal condition, the object to be recognized 20 can also be a counterfeit, for example, a fake finger. In addition, the technology of processing the captured images by the image capturing component 40 is well developed, and the image processing technology is not the key point of the present invention. Moreover, such image processing technology can be readily implemented by those skilled in the field of the present invention based on existing techniques and the disclosure of the present invention. Therefore, no further descriptions are made herein on how the image capturing component 40 captures the image of the object to be recognized 20 and how algorithms are used to recognize the fingerprint and record the features of the fingerprint.

Figure 4:
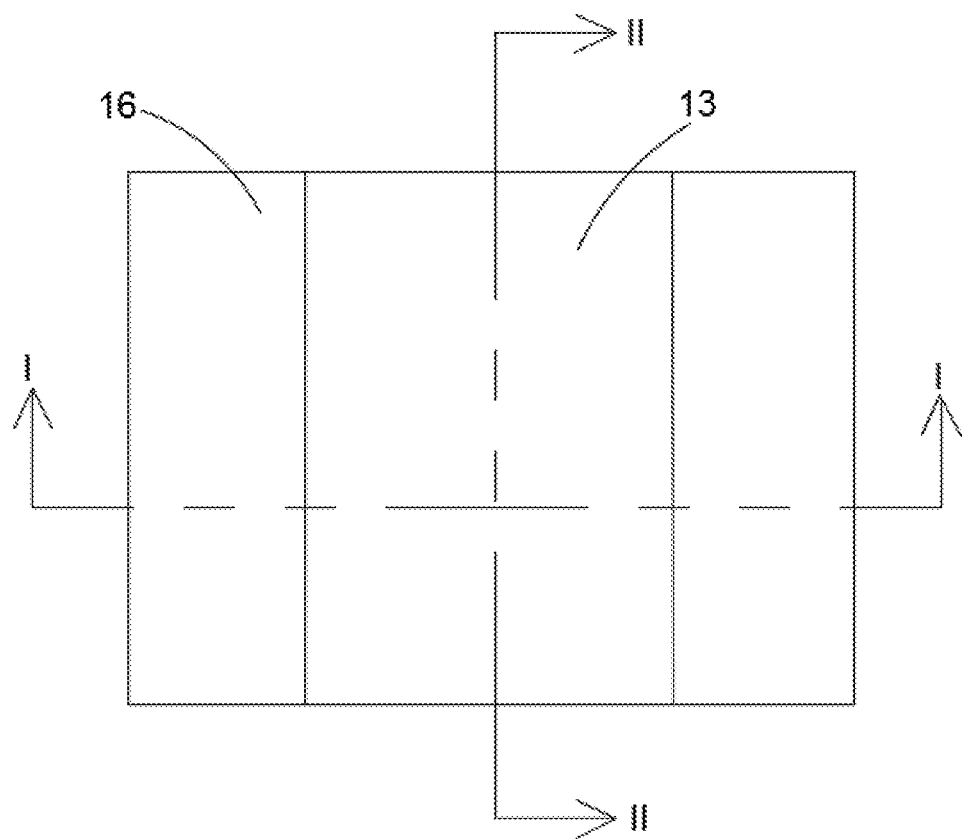
FIG. 4 is a top view of the curved fingerprint recognizing device of the first embodiment of the present invention, wherein the first surface has the opening.
Figure 5:
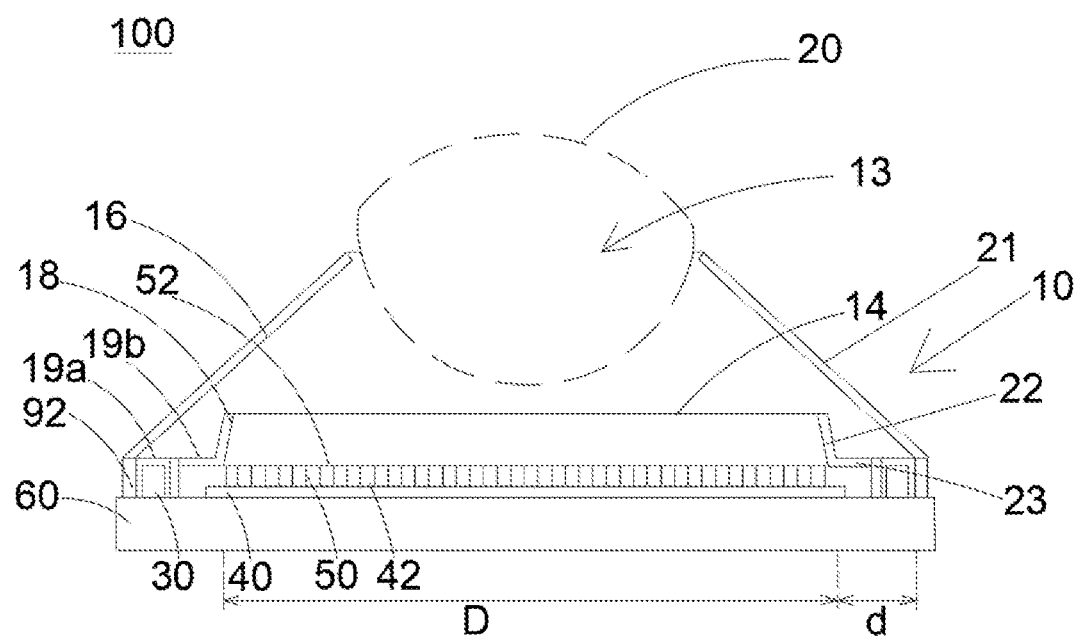
FIG. 5 is a sectional view of the curved fingerprint recognizing device of the first embodiment obtained along the direction I-I in FIG. 1, wherein the first surface has the opening.
Figure 6:
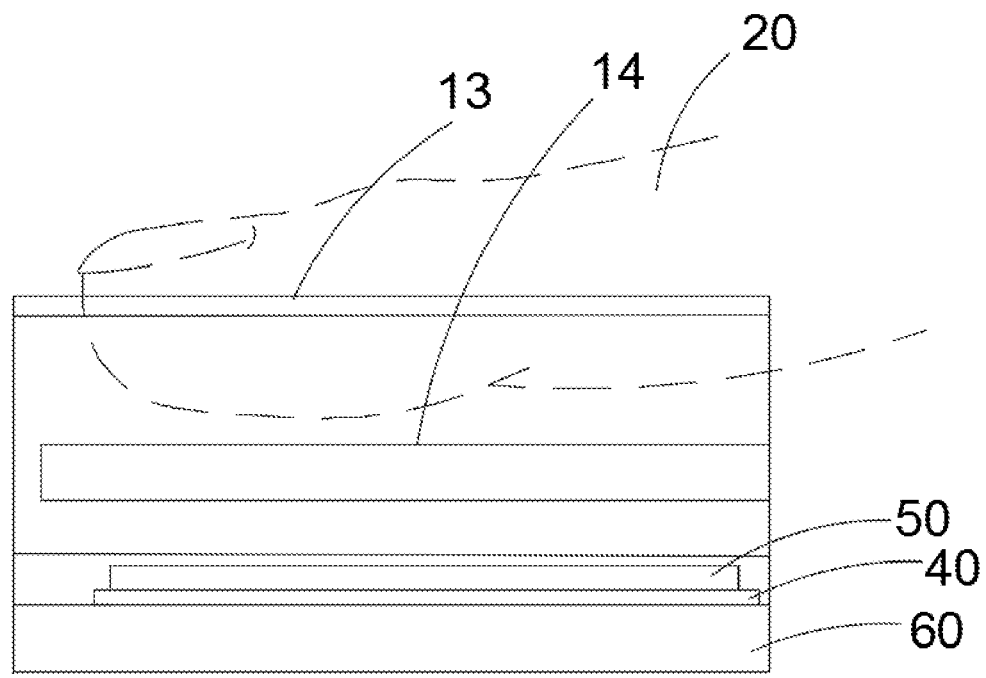
FIG. 6 is a sectional view of the curved fingerprint recognizing device of the first embodiment obtained along the direction II-II in FIG. 1, wherein the first surface has the opening.

Notably, after the light beams L1, L2 enters into the light-guiding component 10 from part of the bottom surface 19a, the light beams L1, L2 will be reflected by the first reflecting layer 21 and/or the second reflecting layer 22 and/or the third reflecting layer 23, so as to be transmitted toward the first surface 12. In this way, it can effectively make the light beams L1, L2 enter into the operational zone of the light-guiding component 10. Such operational zone can be the area between the first surface 12 and the second surface 14 to enhance the light efficiency of the curved fingerprint recognizing device 100. In addition, as shown in FIGS. 4 to 6, the first surface 12 of the first embodiment can optionally have an opening 13, and the opening 13 can occupy part or all of the first surface 12. In other words, when the first surface 12 has an opening 13, the inside of the light-guiding component 10 can be hollow, and air is filled inside the inner space of the light-guiding component 10. Thus, users can put the object to be recognized 20, for example, a finger, into the opening 13 suspendly (without touching any component), so that images of the fingerprints on both sides and the bottom of the finger can be captured.

As an example, in the first embodiment, after the light beam L1 passing through the bottom surface 19a, the light beam L1 can be reflected by the first reflecting layer 21 on the outer side wall 16 to the second reflecting layer 22 on the inner side wall 18. Then, it is further reflected by the second reflecting layer 22 back to the first reflecting layer 21, so that the light beam L1 can be reflected by the first reflecting layer 21, to be transmitted to the first surface 12, and to be used by the curved fingerprint recognizing device 100. In addition, in the first embodiment, after another light beam L2 passing through the bottom surface 19a, light beam L2 will be reflected by one point of the first reflecting layer 21 to the second reflecting layer 22, and the second reflecting layer 22 will reflect the light beam L2 to another point of the first reflecting layer 21. This point of the first reflecting layer 21 further reflects the light beam L2, so that the light beam L2 is transmitted to the first surface 12, to be used by the curved fingerprint recognizing device 100.

Figure 16:
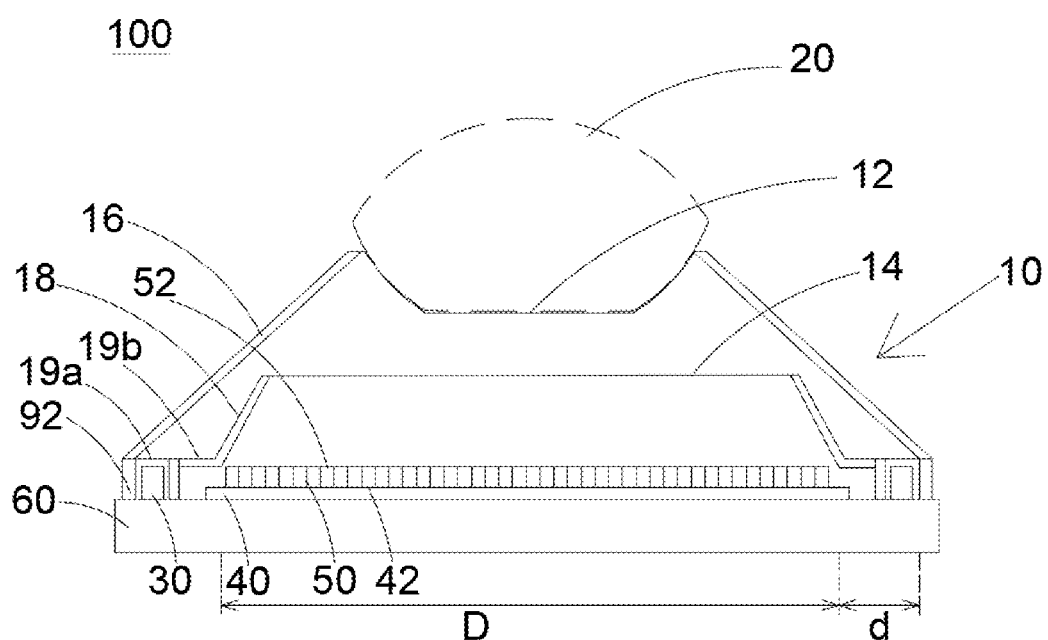
FIG. 16 is a sectional view of the curved fingerprint recognizing device of the first embodiment obtained along the direction I-I in FIG. 1, wherein the first surface of the light-guiding component is composed of two arc surfaces and one plane.

In the first embodiment, the curved fingerprint recognizing device 100 can also comprise at least one collimator 50. The collimator 50 is disposed between the second surface 14 of the light-guiding component 10 and the image capturing component 40. The collimator 50 can be single collimator or two collimators configured in parallel. In the first embodiment, the collimator 50 can be connected to the image capturing component 40 through optical clear adhesive (not shown in the drawing), but not limited thereto. As the technology to use the collimator 50 to correct the deviating light beams is well developed, no further descriptions are made herein on how the collimator 50 corrects the deviating light beams. It is to be noted that, the collimator 50 has multiple euphotic zones 52. The multiple euphotic zones 52 respectively correspond to the multiple pixel areas 42 of the image capturing component 40, for example, 96×96, 72×128 or 96×192 arrays. Light beams L1 or L2 reflected by each point of the object to be recognized 20 can pass through each corresponding euphotic zone 52, and be transmitted to the corresponding pixel area 42, instead of being transmitted to other pixel areas 42. Thus, the image capturing quality of the curved fingerprint recognizing device 100 is greatly enhanced, but not limited thereto. In other variations, the curved fingerprint recognizing device 100 can optionally do not comprise the collimator 50. In addition, in the first embodiment, the first surface 12 of the light-guiding component 10 can have single curved surface 121 or is made of single curved surface 121. In particular, the curved surface 121 can be an arc surface. Alternatively, the first surface 12 of the light-guiding component 10 can also be composed of two arc surfaces and one plane, and the plane is connected between the two arc surfaces, as shown in FIG. 16.

Figure 7:
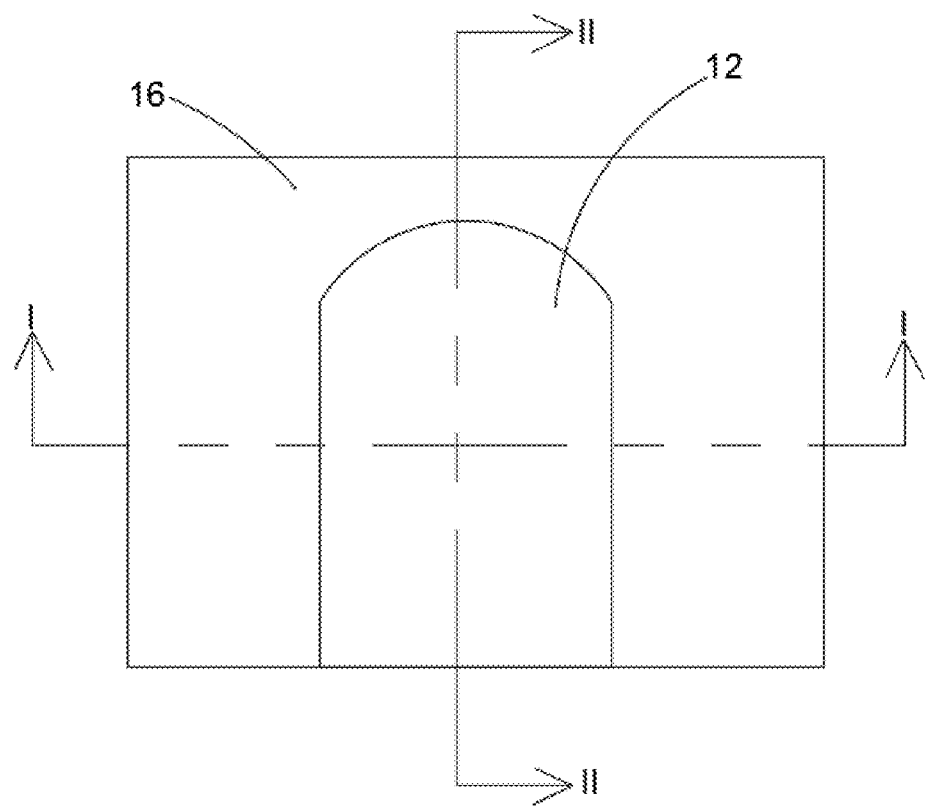
FIG. 7 is a top view of the curved fingerprint recognizing device of the second embodiment of the present invention.
Figure 8:
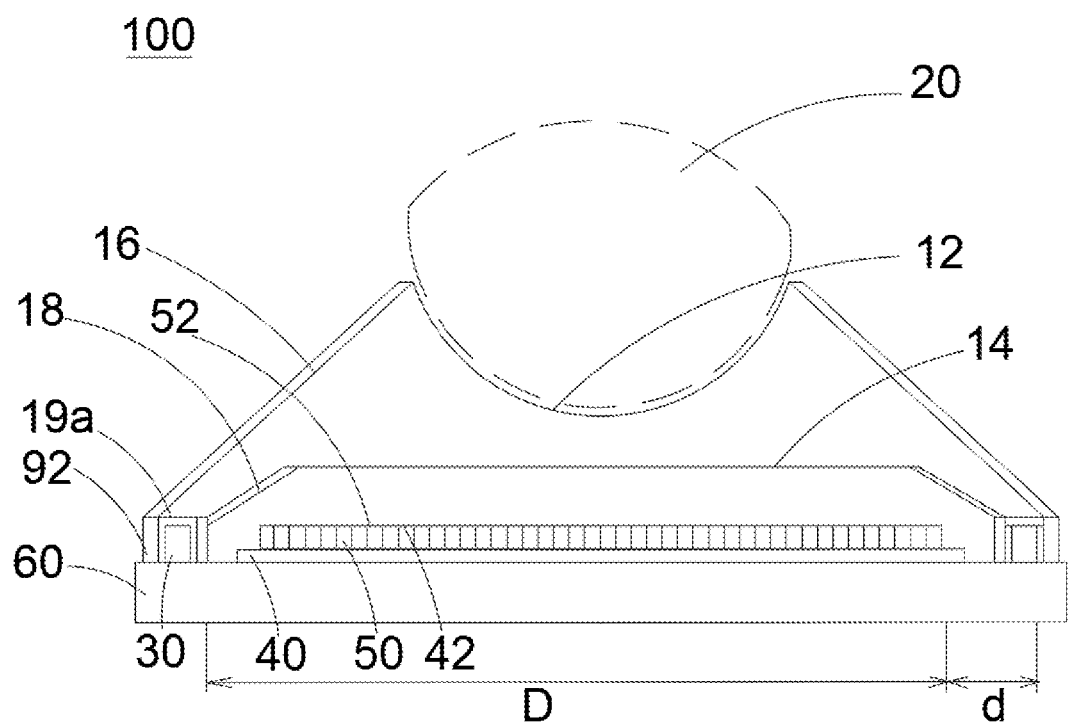
FIG. 8 is a sectional view of the curved fingerprint recognizing device of the second embodiment obtained along the direction I-I in FIG. 7.
Figure 9:
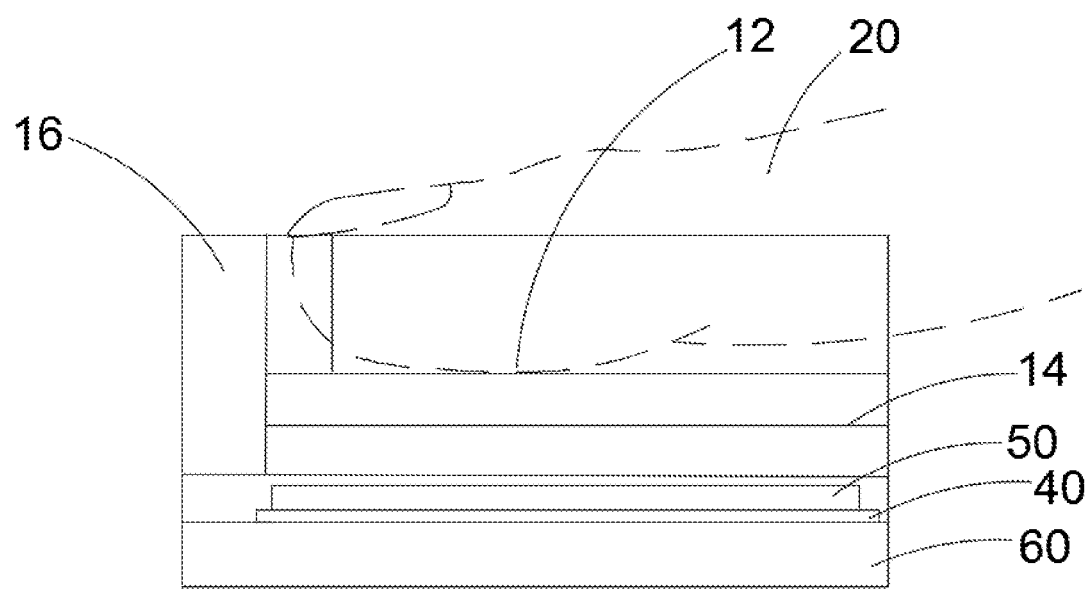
FIG. 9 is a sectional view of the curved fingerprint recognizing device of the second embodiment obtained along the direction II-II in FIG. 7.

Please refer to FIGS. 7 to 9, FIG. 7 is a top view of the curved fingerprint recognizing device of the second embodiment of the present invention, FIG. 8 is a sectional view of the curved fingerprint recognizing device of the second embodiment obtained along the direction I-I in FIG. 7, and FIG. 9 is a sectional view of the curved fingerprint recognizing device of the second embodiment obtained along the direction II-II in FIG. 7. Most technical manners and features of the second embodiment of the present invention are similar to the first embodiment or other embodiments. In contrast to the first embodiment, the second embodiment has the following features: as shown in FIGS. 7 to 9, the light-guiding component 10 does not have the bottom surface 19b and the third reflecting layer 23, and the distance between the outer side wall 16 and the inner side wall 18 decreases along the direction away from the first surface 12 (along with increasing a distance far away from the first surface 12). In other words, after the light beam L1 passing through the bottom surface 19a, the light beam L1 can be reflected by the first reflecting layer 21 on the outer side wall 16 to the second reflecting layer 22 on the inner side wall 18, and then be transmitted directly from the second reflecting layer 22 or through the first reflecting layer 21 on the outer side wall 16 toward the first surface 12, and consequently be used by the curved fingerprint recognizing device 100.

Figure 10:
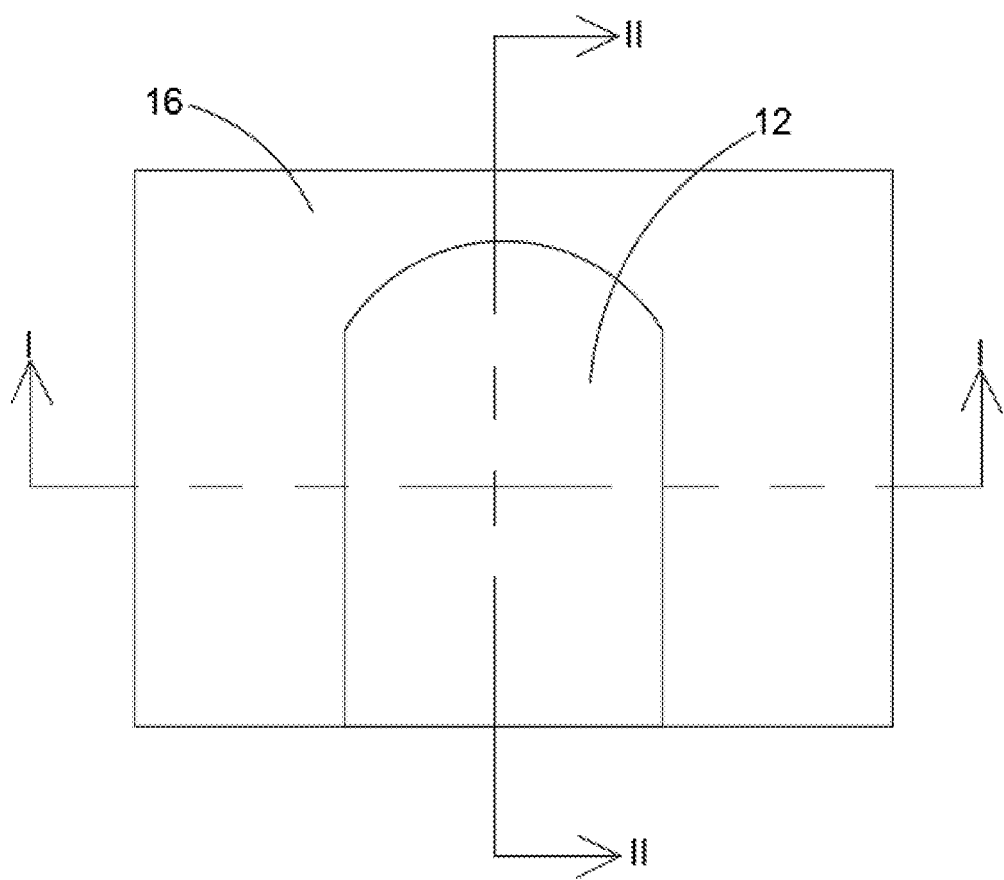
FIG. 10 is a top view of the curved fingerprint recognizing device of the third embodiment of the present invention.
Figure 11:
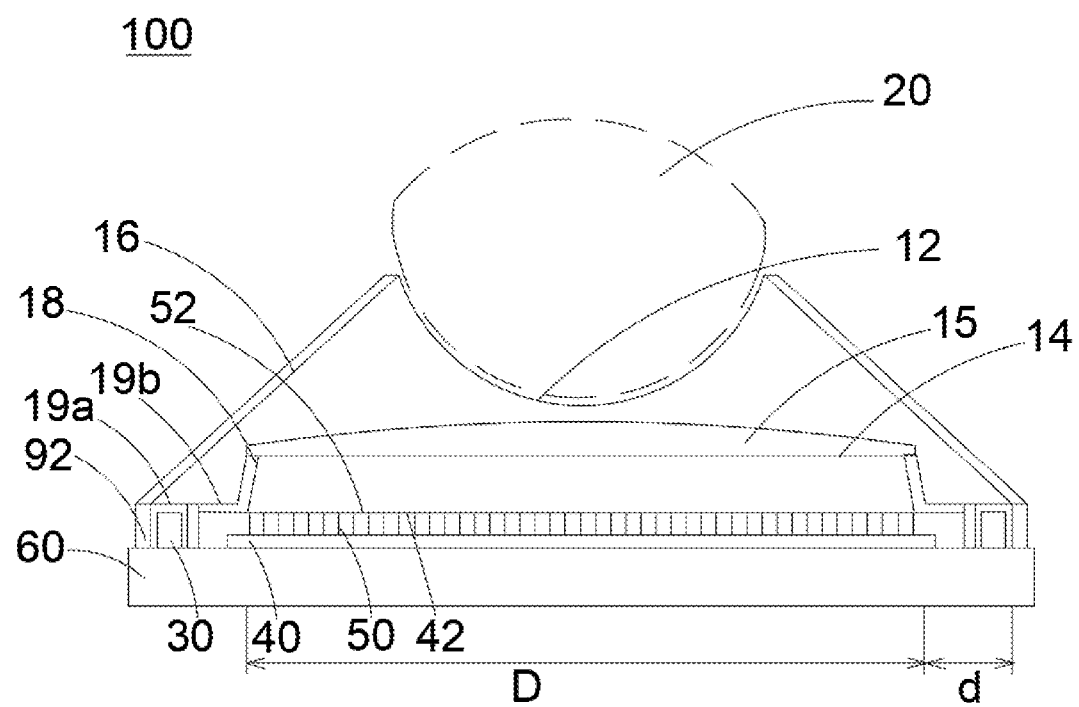
FIG. 11 is a sectional view of the curved fingerprint recognizing device of the third embodiment obtained along the direction I-I in FIG. 10.
Figure 12:
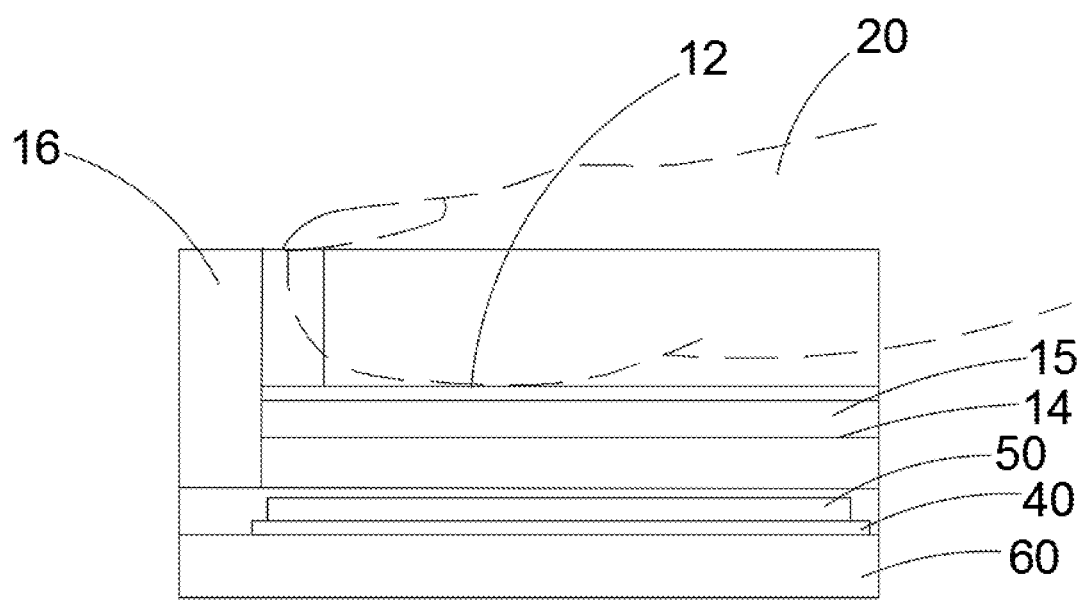
FIG. 12 is a sectional view of the curved fingerprint recognizing device of the third embodiment obtained along the direction II-II in FIG. 10.

Referring to FIGS. 10 to 12, FIG. 10 is a top view of the curved fingerprint recognizing device of the third embodiment of the present invention, FIG. 11 is a sectional view of the curved fingerprint recognizing device of the third embodiment obtained along the direction I-I in FIG. 10, and FIG. 12 is a sectional view of the curved fingerprint recognizing device of the third embodiment obtained along the direction II-II in FIG. 10. Most technical manners and features of the third embodiment of the present invention are similar to the first embodiment, the second embodiment or other embodiments. In contrast to the first embodiment, the second embodiment or other embodiments, as shown in FIGS. 10 to 12, the third embodiment has the following features: the curved fingerprint recognizing device 100 also has a plano-convex lens 15 disposed on the second surface 14 and located above the collimator 50, or the plano-convex lens 15 is used to replace the collimator 50, and the flat surface of the plano-convex lens 15 contacts the second surface 14, the convex surface of the plano-convex lens 15 faces the first surface 12, i.e., it is convex on the top (convex facet on the object side), and flat on the bottom (flat facet on the image side). With the configuration of the plano-convex lens 15, the third embodiment can effectively collect the light beams reflected by the object to be recognized 20, so as to enhance the light efficiency. In particular, the optical parameters of the plano-convex lens 15 can be adjusted according to actual needs. For example, the plano-convex lens 15 can meet Eq. (2):

$$f = \frac{R}{n-1}$$ Eq. (2)

$$te = tc + \left(R - \sqrt{R^2 - \frac{\phi^2}{4}}\right)$$

wherein, Ø is diameter, tc is center thickness, R is radius of curvature, to is edge thickness, f is focal length. As an example, the light-guiding component 10 having the plano-convex lens 15 can meet this condition: 0.15<R1/f<1.5, wherein R1 is radius of curvature of the first surface 12, and f is focal length of the light-guiding component 10.

Figure 13:
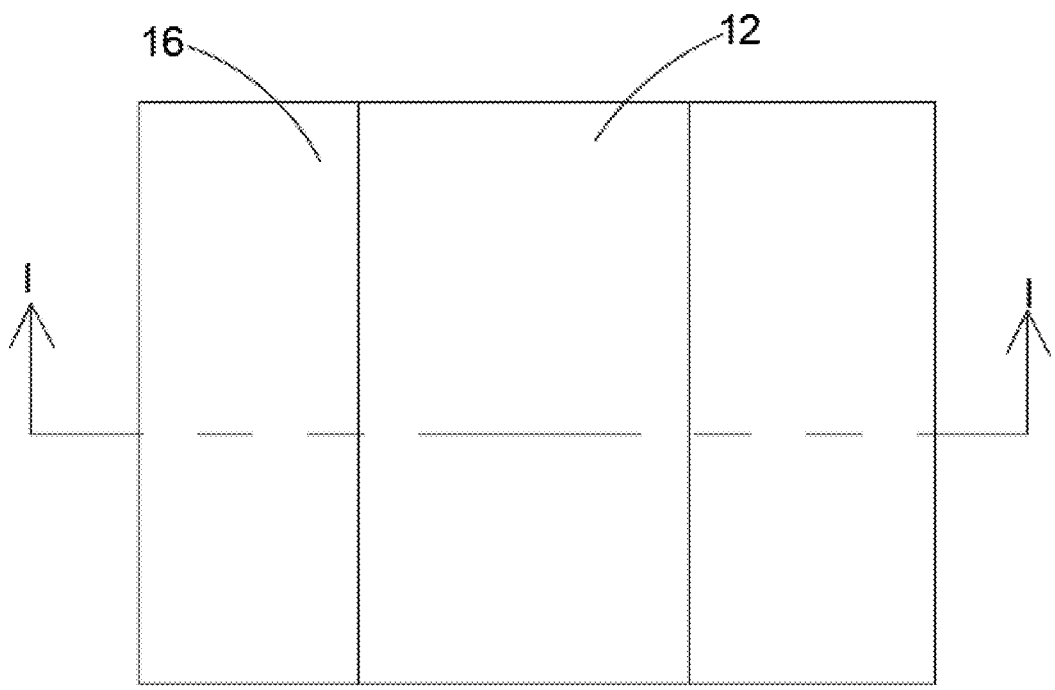
FIG. 13 is a top view of the curved fingerprint recognizing device of the fourth embodiment of the present invention.
Figure 14:
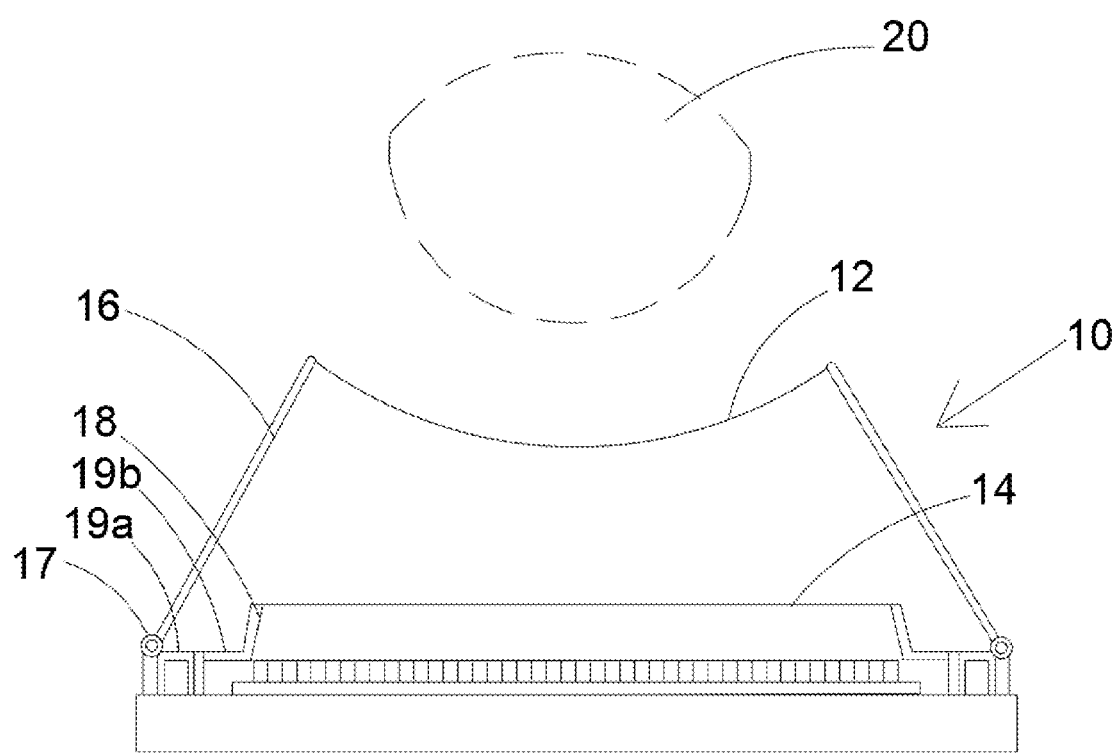
FIG. 14 is a sectional view of the curved fingerprint recognizing device of the fourth embodiment obtained along the direction I-I in FIG. 13, wherein the object to be recognized is not in contact with the first surface.
Figure 15:
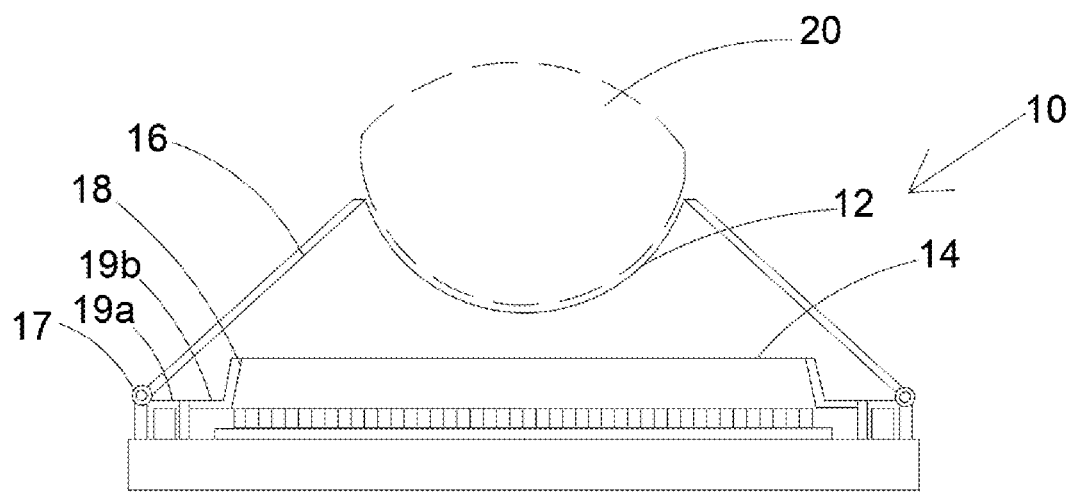
FIG. 15 is a sectional view of the curved fingerprint recognizing device of the fourth embodiment obtained along the direction I-I in FIG. 13, wherein the object to be recognized is in contact with the first surface.

Referring to FIGS. 13 to 15, FIG. 13 is a top view of the curved fingerprint recognizing device of the fourth embodiment of the present invention; FIG. 14 is a sectional view of the curved fingerprint recognizing device of the fourth embodiment obtained along the direction I-I in FIG. 13, wherein the object to be recognized is not in contact with the first surface; and FIG. 15 is a sectional view of the curved fingerprint recognizing device of the fourth embodiment obtained along the direction I-I in FIG. 13, wherein the object to be recognized is in contact with the first surface. Most technical manners and features of the fourth embodiment of the present invention are similar to the first to third embodiments or other embodiments. In contrast to the first to third embodiments or other embodiments, the fourth embodiment has the following features: as shown in FIG. 13 to FIG. 15, the first surface 12 of the light-guiding component 10 is a transparent flexible layer, whereas the second surface 14 and bottom surface 19a are transparent hard layer, wherein the outer side wall 16 is a hard layer, and the space enclosed by the first surface 12, second surface 14, outer side wall 16, inner side wall 18 and bottom surfaces 19a, 19b is filled with air. Thus, when the object to be recognized 20 is placed on the first surface 12 of the light-guiding component 10, the first surface 12 can move downward according to the shape of the object to be recognized 20 and be further curved, i.e., the curvature of the first surface 12 can be changed. In other words, the inclination angle of the outer side wall 16 can be changed according to a downward force of the object to be recognized 20.

Moreover, in the fourth embodiment, the outer side wall 16 can be optionally pivoted onto the bottom surface 19a of the light-guiding component 10 through a spin axis 17. Thus, when the first surface 12 changes its curvature according to the object to be recognized 20, the outer side wall 16 will simultaneously change its inclination angle (i.e., the angle between the outer side wall 16 and the bottom surface 19a).

Based on the above descriptions, the curved fingerprint recognizing device of the present invention can have one or more of the following advantages:

(1) The light-guiding component has a curved surface and can capture fingerprints of a bottom and sidewalls of an object to be recognized at the same time. Therefore, it not only saves the image capturing time, but also increases the accuracy of subsequent recognition thanks to the increased fingerprint features for interpretation resulting from increased image area.

(2) The collimator can make the divergent light beam change to collimated light beam such that the image capturing quality can be further enhanced.

(3) The light-guiding component has the opening such that the non-planar images of the object to be recognized suspendly placed in the opening can be captured.

(4) The light-guiding component has the flexible material such that the first surface can contact the object to be recognized and its curvature can be changed according to the shape of the object to be recognized.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A curved fingerprint recognizing device, comprising:
    a light-guiding component, comprising:
        a first surface, at least comprising a curved surface, and a height of a center of the first surface is lower than heights of two sides of the first surface;
        a second surface, located opposite to the first surface;
        an outer side wall, connected between the first surface and the second surface, the outer side wall being inclined relative to the first surface;
        an inner side wall, connected to the second surface and inclined relative to the first surface; and
        a bottom surface, located opposite to the first surface, and connected horizontally between the outer side wall and the inner side wall;

a first reflecting layer and a second reflecting layer, disposed on the outer side wall and the inner side wall respectively;

a light source, disposed between the outer side wall and the inner side wall of the light-guiding component for emitting a light beam; and an image capturing component, located opposite to the second surface of the light-guiding component, wherein the light beam is reflected by at least one of the first reflecting layer and the second reflecting layer after passing through the bottom surface so as to be transmitted to the first surface having the curved surface and thereby obtaining fingerprints of a bottom and sidewalls of an object to be recognized at the same time.

2. The curved fingerprint recognizing device of claim 1, further comprising a plano-convex lens disposed on the second surface, wherein a flat surface of the plano-convex lens contacts with the second surface, and a convex surface of the plano-convex lens faces the first surface.

3. The curved fingerprint recognizing device of claim 1, further comprising a third reflecting layer disposed on one part of the bottom surface, wherein the light beam is reflected by at least one of the first reflecting layer, the second reflecting layer and the third reflecting layer after passing through the other part of the bottom surface so as to be transmitted to the first surface having the curved surface.

4. The curved fingerprint recognizing device of claim 1, wherein the first surface is composed of the curved surface.

5. The curved fingerprint recognizing device of claim 1, wherein the first surface is composed of two arc surfaces and a plane, and the plane is connected between the two arc surfaces.

6. The curved fingerprint recognizing device of claim 1, wherein a distance between the outer side wall and the inner side wall is increased or decreased along with increasing a distance far away from the first surface.

7. The curved fingerprint recognizing device of claim 1, further comprising at least one collimator disposed between the second surface of the light-guiding component and the image capturing component.

8. The curved fingerprint recognizing device of claim 1, wherein the outer side wall is extending to a side of the first surface from the second surface, and a height of the outer side wall is higher than the height of the center of the first surface.

9. The curved fingerprint recognizing device of claim 1, wherein the light-guiding component is made of hard materials or flexible materials.

10. The curved fingerprint recognizing device of claim 1, wherein the first surface has an opening, and the light beam is transmitted to the opening of the first surface.

11. The curved fingerprint recognizing device of claim 1, wherein the outer side wall is pivotally connected to the bottom surface of the light-guiding component.

12. The curved fingerprint recognizing device of claim 11, wherein an inclination angle of the outer side wall is changed according to a downward force of the object to be recognized.

13. The curved fingerprint recognizing device of claim 1, wherein the light source is disposed underneath the bottom surface of the light-guiding component.

14. The curved fingerprint recognizing device of claim 1, wherein a depth of the center of the first surface is larger than or equal to half of a height of the object to be recognized.

15. The curved fingerprint recognizing device of claim 1, wherein a height of a connection point of the outer side wall and the first surface is higher than the height of the center of the first surface.

16. The curved fingerprint recognizing device of claim 1, wherein the first surface and second surface of the light-guiding component constitute a plano-concave lens.

17. The curved fingerprint recognizing device of claim 1, wherein the bottom surface has multiple stages with different heights.

18. The curved fingerprint recognizing device of claim 1, wherein the second surface and the inner side wall define a trench of the light-guiding component.

19. The curved fingerprint recognizing device of claim 18, wherein an inner diameter of the trench is increased along with increasing a distance far away from the first surface.

20. The curved fingerprint recognizing device of claim 1, further comprising a support extending from the bottom surface toward a side of the light source.

\* \* \* \* \*